United States Patent [19]

Sears

[11] 4,399,275
[45] Aug. 16, 1983

[54] PREPARATION OF HIGHLY REACTIVE CELLULOSE

[75] Inventor: Karl D. Sears, Shelton, Wash.

[73] Assignee: ITT Corporation, New York, N.Y.

[21] Appl. No.: 337,447

[22] Filed: Jan. 6, 1982

[51] Int. Cl.$^3$ .............................................. C08B 3/06
[52] U.S. Cl. ..................................... 536/70; 536/101
[58] Field of Search ..................... 536/95, 96, 101, 56, 536/70

[56] References Cited

U.S. PATENT DOCUMENTS 2,469,764  5/1949  Erickson ............................... 536/96
2,692,877  10/1954  Gray et al. ............................. 536/70
2,847,411  8/1958  Mitchell et al. ....................... 536/96
3,148,106  9/1964  Mitchell et al. ...................... 536/101

FOREIGN PATENT DOCUMENTS 516344  9/1955  Canada .................................. 536/70

Primary Examiner—Ronald W. Griffin
Attorney, Agent, or Firm—James B. Raden; Harold J. Holt

[57] ABSTRACT

Highly reactive cellulose is prepared by mercerizing cellulosic material and reacting it with an hydroxyalkylating agent to a degree of substitution ranging from 0.05 to 0.3, said degree of substitution being short of rendering the cellulose appreciably soluble in water. The highly reactive cellulose is particularly useful for the preparation of such cellulose derivatives as cellulose acetate at considerably improved production levels.

9 Claims, No Drawings

PREPARATION OF HIGHLY REACTIVE CELLULOSE

This invention relates to a process for the preparation of highly reactive cellulose and particularly to a process for the preparation of highly reactive cellulosic pulp of the type used in making cellulose acetate and other cellulose derivatives.

Considerable effort has been expended to improve the reactivity of cellulose so as to decrease the manufacturing costs of cellulose derivatives. One known approach to achieving such a goal is the treatment of cellulosic pulp in the presence of an alkali with an alkylene oxide to produce a trace substituted hydroxyethylated pulp. Such a process is disclosed, for example, by J. L. Riley in *Solvent Spun Rayon, Modified Cellulose Fibers and Derivatives*, edited by A. F. Turbak, ACS Symposium Series 58, ACS, Washington, D.C. page 149 (1977). While some improvement in reactivity has been achieved by this reaction, the improvement has not been suffficient to economically justify its use. The process, for example, does not improve the reactivity of cellulose in "low catalyst" acetylation processes, widely used for the preparation of cellulose acetate.

The treatment of cellulose with alkali under "mercerizing conditions" is a well known procedure which converts cellulose from its native form, cellulose I, to a more thermodynamically stable, less crystalline form, cellulose II. Because it is less crystalline and more amorphous, mercerized cellulose would presumably be more readily accessible to reagents. Unfortunately, mercerized pulps are relatively inert to acetylation as a consequence of structural collapse in the interfibrillar spaces upon drying. Thus, the prior art has taught that just enough alkali should be used to refine cellulose during alkaline bleaching stages, but the caustic amount and temperatures used should be insufficient to produce mercerizing conditions in the production of acetate grade pulps.

It is accordingly a primary object of the present invention to provide a process for the preparation of cellulose having a higher reactivity than has previously been possible.

It is an additional object of this invention to provide a process for producing cellulosic pulps which will significantly reduce the costs of manufacturing cellulose derivatives.

It is a more specific object of this invention to provide a cellulosic pulp which will produce improved levels of cellulose acetate production and superior cellulose acetate products.

The process of achieving the foregoing and other objects of the invention involves the preparation of highly reactive cellulose by mercerizing cellulosic material, reacting the mercerized cellulose with an hydroxyalkylating agent to a degree of substitution of the cellulose ranging from 0.05 to 0.3, the degree of substitution being insufficient to render the cellulose appreciably soluble in water, and recovering the highly reactive substantially water insoluble cellulose reaction product.

Prior attempts to improve cellulose reactivity by hydroxyalkylation scrupulously avoided mercerizing conditions. Such conditions are well known and well defined in the cellulose industry. See, for example, *Pulping Processes*, S. A. Rydholm, Interscience Publishers, 1965, pages 143-145. In the alkylene oxide treatment of cellulose disclosed in the above identified publication by J. L. Riley, only a 2% solution of sodium hydroxide, based on pulp, was used to promote the reaction at ambient temperatures. This is well below the amount of sodium hydroxide necessary for mercerizing the pulp. It was quite unexpected to find, in accordance with the present invention, that modification of the mercerized cellulose with an hydroxyalkylating agent would not only overcome the inactivating effects that mercerization imparts to fibers in acetylation processes, but also provide a number of other benefits to the cellulose. Moreover, it was also found that only the alkylene oxides were successful in the present process. Other reagents, such as acrylonitrile, cyanuric chloride and formaldehyde, when used to modify mercerized pulp, were found to be unsatisfactory in overcoming the inactivating effects. Only the alkylene oxides reacted with the pulp so that instead of collapsing when the pulp dried, it remained "wedged open" and maintained a high level of reactivity in acetylation processes.

The critical concentration of the caustic solution (weight % by weight of the solution of sodium, or less often, potassium hydroxide) necessary for mercerization is dependent upon both temperature and type of cellulose. However, in general, the caustic solution strength for mercerizing conditions at ambient temperatures will be more than 5%, and usually about 6-12%. For a given caustic concentration, mercerization occurs more readily at low temperatures than high. At a given temperature, such as 0° C., a greater caustic concentration is required to mercerize a prehydrolyzed kraft pulp than a sulfite pulp, for example. The conditions (temperature, caustic concentration) required to mercerize various cellulosic material is well known. See, for example, the aforementioned Rydholm text.

The hydroxyalkylating agents useful in the invention are generally the alkylene oxides, including ethylene, propylene and butylene oxides and halogen substituted alkylene oxides such as epichlorohydrin. Benefits of the invention are achieved with about 3 to 10% by weight hydroxyalkoxy ($-OC_nH_{2n}OH$) group content on the cellulose. This corresponds to a degree of molar substitution per anhydroglucose unit in cellulose of from 0.05 to 0.27. For hydroxyethoxy ($OC_2H_4OH$) groups, the content should be between 4.3 and 9.5% which corresponds to a degree of molar substitution per anhydroglucose unit in cellulose between 0.12 and 0.27. For propylene oxide, benefits can be expected in the 3.6-5.7% hydroxypropoxy ($OC_3H_6OH$) group content range which corresponds to a degree of molar substitution per anhydroglucose unit in cellulose of 0.08 to 0.13. For butylene oxide, the degree of molar substitution will be as low as 0.05. Because introduction of hydroxypropyl ($-C_3H_6OH$) groups using propylene oxide is more efficient in promoting the benefits of the invention, and also represents a less expensive process, this is a preferred alkylene oxide for use in the invention. It is principally in the substitution ranges set forth above that fiber inactivation resulting from the mercerization process is overcome. This has been observed as a marked reduction in the haze levels of cellulose acetate dopes produced with the highly reactive cellulose pulps of the invention and also in the very marked reduction of color in the acetate dopes.

In the practice of the invention, the cellulosic pulp may be pretreated with NaOH which acts both to mercerize the pulp and as a catalyst for the reaction of cellulose with alkylene oxides. Normally hydroxyalkylation will be conducted at the same caustic solution concentration as the mercerizing reaction, although it need not be (e.g. solution concentrations from 1 to 40% may be used for hydroxyalkylation). Certain bleaching and refining operations for cellulosic pulps involve a cold caustic extraction stage utilizing from 6 to 12% caustic solution at ambient temperatures (5° to 40° C.) to extract hemicelluloses. During the cold caustic extraction stage, mercerization can be brought about. It has been found that highly reactive cellulosic pulps of acetylation quality may be produced by combining into one integral operation the cold caustic extraction stage using mercerizing conditions with alkylene oxide modification of the pulp.

In theory from 6 to 40% caustic solution may be used to mercerize the pulp. In practice however, a preferred method of carrying out the present invention is to first conduct a cold caustic extraction using from 6 to 12%, preferably 10%, caustic solution at a temperature of from 15° to 35° C., preferably 23°–25° C., at low consistency (weight of pulp per total weight of pulp slurry) of from 1 to 10%, preferably 2.5%, as is normally done in a pulping mill operation to extract hemicellulose and to mercerize the pulp. The pulp slurry should then be dewatered to a high consistency of from 10 to over 50%, preferably over 25%, using a centrifuge and or press and then reacted with an alkylene oxide in the gas phase (25° C. for ethylene oxide, 50° C. for propylene oxide) before rinsing and further processing. In industrial practice, the consistency should be increased as high as possible (to about 50% or even more) to minimize side reactions of alkylene oxides with water. During reaction with alkylene oxide, the caustic concentration should preferably remain at the mercerizing level, i.e., at 6 to 12%, preferably 10%. A cold caustic refining process, of the type which typically may be used in the practice of the present invention, is more fully disclosed in U.S. Pat. No. 3,148,106, assigned to the present assignee. Reference to the foregoing patent should be made for a more complete description of such a refining process.

A wide variety of cellulosic material, principally pulps, are useful in the practice of the present invention, incuding both prehydrolyzed kraft and sulfite pulps. While the process is preferably combined with a refining operation, the process is nevertheless useful in both bleached and unbleached pulps. The invention is particularly useful for the preparation of acetate grade pulps. However, the highly reactive pulps may be used for the manufacture of other cellulose derivatives and plastics, including other cellulose esters and cellulose ethers such as ethyl cellulose.

Conventional acetylation processes used for the preparation of cellulose acetate involve both high and low acid catalyst reactions. The present process leads to acetylation quality pulps which are highly reactive in both high and low catalyst processes. In many cases, the highly reactive cellulosic pulps also show substantially improved acetate filterability levels compared to standard acetylation grade pulps. Thus, cellulosic pulps prepared in accordance with the invention lead to significantly improved levels of acetate production. Alternatively, if desired, acetylation times presently used in acetate production may be used to obtain a superior product because standard acetylation times in low catalyst evaluations of the cellulosic pulps of the invention were found to yield acetates of extremely high clarity. This is important for solution cast acetate films and acetate molding compounds where color and clarity are critical.

The following examples are illustrative of practice of the invention.

EXAMPLE 1

A cellulosic pulp which has not previously been dried (2114 g, 780 g Oven Dried-O.D.) prepared from southern pine by a steam prehydrolyzed kraft cooking process and several bleach stages was cold caustic extracted in 10% NaOH solution, made by adding 12,755 g of water and 5.2 g of 30% $H_2O_2$ to 15,155 g of 19.3% NaOH (pulp consistency=2.6%). The pulp was slurried for 10 minutes at a temperature of 23°–24° C. before its recovery in a variable speed centrifuge for 15 minutes. This stock (2895 g) was mechanically shredded for 30 minutes in an alkali shredder. The shredded stock was subdivided into nine equal portions of 80 g. O.D. equivalent (297 g) based on the starting pulp. The portions were placed into nine, one-gallon (3.78 liter-l), heavy duty, plastic containers which were then flushed with nitrogen. Propylene oxide (12 g O.D.) was placed in each container which was then sealed and placed in a heated roller cabinet (50° C.) for two hours. Based on the O.D. weight of the starting pulp, this amount of propylene oxide amounted to 15% by weight. The stocks were then removed from each container and combined in wash water (15 l) and slurried at 23°–24° C. for 10 minutes. The pulp was centrifuged and then slurried in $SO_2$ water (about 15 l at pH 2.7) for 10 minutes, and then recovered and rinsed in the centrifuge. The pulp coke was stored in a polyethylene bag prior to blending with other samples.

The products from two other replicate reactions were combined with the above sample. The combined sample weighed 5,970 g with an O.D. of 34.4% giving a total of 2,054 g or an overall yield of 95.1%. The blended sample was sheeted into approximately 50 g O.D. sheets and dried. The pulp had a hydroxypropoxy content of 3.4%.

EXAMPLES 2 and 3

Example 1 was repeated using 20% and then 25% propylene oxide, these percentages again being based on the O.D. weight of the cold caustic extracted stock. The resulting pulps had hydroxypropoxy contents of 4.6% and 5.8% respectively.

The three propylene oxide cellulosic pulps of Examples 1, 2 and 3 were evaluated for acetate preparation and compared with an unsubstituted control. The results indicated an increase in reactivity paralleling the proportion of propylene oxide substitution. The clarity and color values of acetate dopes prepared from the propylene oxide substituted pulps were all superior to the control and filterability values were also clearly enhanced. In high catalyst filterability tests, the propylene oxide substituted pulps were highly reactive, the 4.6% hydroxypropoxy substituted pulp (Example 2 using 20% propylene oxide) being the most reactive. Low catalyst acetylation tests likewise indicated that the propylene oxide pulps were more reactive than standard acetylation grade pulps.

EXAMPLES 4 and 5

In these two examples, pulps were reacted with ethylene oxide and propylene oxide, respectively, under nonmercerizing conditions. The procedures used to prepare the substituted pulps were essentially the same as that of Example 1 except that (a) a 5% NaOH pretreatment was used rather than a 10% pretreatment and (b) reaction time was 3-4 hours at ambient temperatures rather than 2 hours since less base was available to promote reaction.

Pretreatment was carried out using a never-dried (1165 g, 480 g O.D.) pulp prepared from southern pine wood by a sulfite cook and several bleach stages. The pulp was stirred for 15 minutes in 5% NaOH solution prepared by adding 12,702 g of water to 4,614 g of 19.5% NaOH (pulp consistency=2.6%).

80 g O.D. equivalent samples of the pretreated pulp were placed in a series of heavy duty plastic bottles to which were added 16 g of ethylene oxide or propylene oxide (20% addition level based on O.D. weight of starting pulp). Reaction time was three hours at 24°-28° C. for ethylene oxide and 3.0 to 3.7 hours at 42°-50° C. for propylene oxide.

The products from seven repetitive reaction series were blended to give a combined sample weight of 8.85 kg (3.42 kg O.D.) for the ethylene oxide samples and 9.23 kg (3.40 kg O.D.) for the propylene oxide samples. The level of hydroxyethoxy groups was 6.8%; the level of hydroxypropoxy groups was 3.9%.

The ethylene oxide and propylene oxide substituted products were then evaluated in both high and low acid acetylation tests and compared with similar pulps which had not been modified. In the high acid catalyst tests, both products were found to be quite reactive compared to pulp which was unmodified.

Low catalyst filterability and plastics evaluations were both run and the results showed that the products were less reactive than the unmodified pulp. It was necessary to increase the activation temperature from 40° up to 43°-44° C. to get an acceptable level of reactivity. Even at these temperatures, the reactivity was slow in most instances. Thus, while the reactivity of unmercerized pulp can be increased by reaction with alkylene oxides, it is apparent that reactivity is diminished in low catalyst acetylation processes.

The very high reactivity of alkylene oxide mercerized pulps in low catalyst acetylation processes is illustrated by the following examples.

EXAMPLES 6 and 8

A never-dried cellulosic pulp (1,955 g, 780 g O.D.) prepared from southern pine wood by a sulfite cook and several bleach stages was cold caustic extracted in 10% NaOH solution made by adding 12,914 grams of water and 5.2 g of 30% $H_2O_2$ to 15,155 g of 19.3% NaOH (pulp consistency 2.6%). The pulp was slurried for 10 minutes at a temperature of 23°-24° C. before its recovery in a variable speed centrifuge for 15 minutes. This stock (2,870 g) was mechanically shredded for 30 minutes in an alkali shredder. The shredded stock was subdivided into nine equal portions of 80 g O.D. equivalent (294 g) based on the starting pulp. The portions were placed into nine, one-gallon (3.78 l), heavy duty, plastic containers which were then flushed with nitrogen. Propylene oxide (16 g O.D.) was placed in each container which was then sealed and placed in a heated roller cabinet (50° C.) for two hours. The stocks were then removed from each container and combined in wash water (15 liters) and slurried at 24° C. for 10 minutes. The pulp was centrifuged and then reslurried in $SO_2$ water (15 l at pH of about 2.7) for 10 minutes, and then recovered and rinsed in the centrifuge. The pulp cake was stored in a polyethylene bag prior to blending with other samples.

The products from two other repetitive reactions were combined with the above sample. The combined sample weighed 6,090 g with an O.D. of 37.4% giving a total O.D. weight of 2,052 g or an overall yield of 95%. The blended sample was sheeted into approximately 50 O.D. sheets and dried.

The foregoing example was repeated at lower and higher levels of propylene oxide addition so that the following three samples of propylene oxide substituted pulps were prepared:

EXAMPLE 6

20% propylene oxide added;
4.4% hydroxypropoxy groups.

EXAMPLE 7

15% propylene oxide added;
3.6% hydroxypropoxy groups.

EXAMPLE 8

25% propylene oxide added;
5.3% hydroxypropoxy groups.

These three examples were then evaluated in low catalyst acetylation processes.

EXAMPLE 9

For comparative purposes, a further pulp sample was prepared by processing the same starting pulp in a manner identified to that of Examples 6-8 with the exception that no propylene oxide was added to the reaction. The control pulp was carried through the entire process including cold caustic extraction and heating at 50° C. for 2 hours, but in the absence of propylene oxide. The results of low catalyst (1.4% $H_2SO_4$) acetylation tests for Examples 6-9 are set forth in the following table.

TABLE

|  | Modified Pulps | | | Control Pulp | Standard Acetate |
| --- | --- | --- | --- | --- | --- |
|  | Ex. 7 | Ex. 6 | Ex. 8 | Ex. 9 | Grade Pulp* |
| % —$OC_3H_6OH$ | 3.6 | 4.4 | 5.3 |  |  |
| Temperature, °C. | 23 | 19 | 22 | 28 | 37 |
| Esterification Time, Min. | 237 | 154 | 199 | 217 | 174 |
| Triacetate Haze | 11.1 | 6.7 | 10.1 | 84.7 | 11.8 |
| Diacetate Haze | 12.4 | 9.4 | 11.2 | 22.1 | 17.9 |

*Standard Acetate Grade Pulp values are average or typical for acetate grade pulps currently being commercially manufactured.

As standard low catalyst tests were currently conducted, efforts are made to select conditions requiring an esterification time in the 170-190 minute range. For highly reactive pulps it is therefore necessary to use a lower activation temperature to slow the acetylation process down to conform with the desired time frame. The lower activation temperatures required for the propylene oxide treated pulps are therefore a measure of their greater reactivity. The reactivity of the pulp with an intermediate substitution level (4.4% hydroxypropoxy) was noted to be very high. Even at 19° C., compared to 37°-40° C. for standard acetylation grade pulps, the reaction was less than desired (154 minutes).

The very low haze values, particulary the diacetate haze levels, for the modified pulps indicate the potential of such highly reactive pulps to yield acetates of exceptional clarity which could be important in such markets as specialty plastics. Undoubtedly, carrying out the acetylation in production time frames presently used, but at lower temperatures, would be necessary to obtain this enhanced performance. Conducting acetylations in shorter reaction times at normal temperatures would be expected to lead to more standard levels of haze performance.

The mercerized control stock performed poorly because of high levels of unreacted fibers present in the acetate dope (note very high triacetate haze levels). A considerable amount of fiber was present after triacetate hydrolysis to prepare the diacetate. This material was filtered off prior to preparation of the diacetate flake which was then dissolved in acetone to obtain the much lower diacetate haze value.

I claim:

1. A process for the preparation of cellulose acetate from highly reactive cellulose comprising
mercerizing cellulosic material,
reacting the mercerized cellulose with an hydroxyalkylating agent to a degree of substitution of the cellulose ranging from 0.05 to 0.3, said degree of substitution being insufficient to render said cellulose appreciably soluble in water,
recovering the highly reactive substantially water insoluble cellulose reaction, and acetylating said cellulose reaction product.

2. The process of claim 1 in which the cellulosic material is mercerized with a caustic solution concentration ranging from 6–40%.

3. The process of claim 2 in which the caustic solution is an approximately 10% solution of sodium hydroxide.

4. The process of claim 2 in which the hydroxyalkylation reaction is carried out in the presence of a caustic solution of the same concentration as the mercerizing solution.

5. The process of claim 1 in which the cellulosic material is cellulosic pulp.

6. The process of claim 5 in which the mercerization and hydroxyalkylation steps occur in conjunction with the cold caustic extraction stage of the purification of said cellulosic pulp.

7. The process of claim 1 in which the degree of substitution of the cellulose is from 0.08 to 0.27.

8. The process of claim 7 in which the hydroxyalkylating agent is ethylene oxide and the degree of substitution of the cellulose is from 0.12 to 0.27.

9. The process of claim 7 in which the hydroxyalkylating agent is propylene oxide and the degree of substitution is from 0.08 to 0.13.

* * * * *